0
United States Patent Office 2,842,535
Patented July 8, 1958

2,842,535
DIAZO-AMINO COMPOUNDS

Rudolf Löwenfeld and Konrad Löhe, Offenbach (Main), Germany, assignors to Farbwerke Hoechst Aktiengesellschaft vormals Meister Lucius & Bruning, Frankfurt am Main, Germany, a corporation of Germany No Drawing. Application February 12, 1954
Serial No. 410,024
Claims priority, application Germany February 26, 1953
5 Claims. (Cl. 260—140)

The present invention relates to new diazo-amino compounds; more particularly, it relates to compounds corresponding to the following general formula

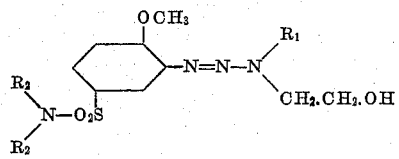

wherein $R_1$ represents a methyl or hydroxy-ethyl group and $R_2$ represents a methyl or ethyl group.

The new compounds are obtained by condensing diazotized 1-amino-2-methoxybenzene-5-sulfonic acid dimethylamide or diazotized 1-amino-2-methoxybenzene-5-sulfonic acid diethylamide with diethanolamine or methyl-ethanolamine. They form brownish crystals which are stable in the dry state as well as in an aqueous or alkaline solution.

The compounds can be mixed with suitable coupling components and the mixtures can be used for the production of valuable water-insoluble azo-dyestuffs which are especially suitable for producing fast prints on fabrics of acetyl cellulose fibers and polyamide fibers or on mixtures of these fibers.

In U. S. Patent No. 2,078,387 are described diazo-amino compounds from diazotized primary aromatic amines and diethanolamine or methyl-ethanolamine, which are used for the production of ice colors. When applied to fabrics of acetyl cellulose fibers or polyamide fibers these known diazo-amino compounds yield prints of moderate evenness or poor fastness properties.

Contrary to the known diazo-amino compounds, the compounds of the present invention yield on fabrics of acetyl cellulose fibers or polyamide fibers full and even prints which simultaneously also possess good fastness properties.

The following examples serve to illustrate the invention but they are not intended to limit it thereto, the parts being by weight:

Example 1

258 parts of 1-amino-2-methoxybenzene-5-sulfonic acid diethylamide are diazotized in the usual manner with hydrochloric acid and sodium nitrite. Into the diazonium chloride solution there is run at 0° C.–5° C., while stirring well, the solution of 116 parts of diethanolamine and 100 parts of sodium carbonate in 700 parts of water. The diazoamino compound precipitates at first in the form of a yellow-brown oil which crystallizes after a short time. The product is filtered off with suction washed with water until neutral and dried at 40° C. 381 parts of a diazoamino compound are obtained which corresponds to the following formula:

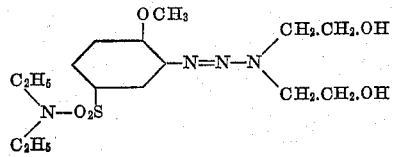

By using in the above example 230 parts of 1-amino 2-methoxybenzene-5-sulfonic acid dimethylamide instead of 258 parts of 1-amino-2-methoxybenzene-5-sulfonic acid diethylamide, 320 parts of the corresponding diazo-amino compound are obtained.

Example 2

258 parts of 1-amino-2-methoxybenzene-5-sulfonic acid diethylamide are diazotized in the usual manner Into the diazonium chloride solution there is run at 0° C.–5° C., while stirring well, the solution of 83 parts of methyl-ethanolamine and 100 parts of sodium carbonate in 700 parts of water. The diazo-amino compound precipitates in the form of a yellow-brown oil which crystallizes after a short time. The product is filtered off with suction, washed with water until neutral and dried at 40° C. 308 parts of a diazo-amino compound are obtained which corresponds to the following formula:

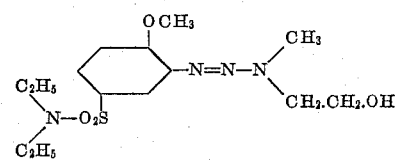

By using in the above example 230 parts of 1-amino 2-methoxybenzene-5-sulfonic acid dimethylamide instead of 258 parts of 1-amino-2-methoxybenzene-5-sulfonic acid diethylamide, 252 parts of the corresponding diazo-amino compound are obtained.

We claim:

1. Diazo-amino compounds corresponding to the following general formula

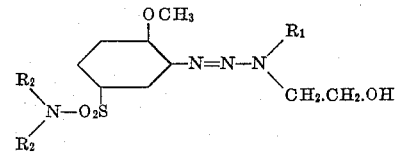

wherein $R_1$ represents a member of the group consisting of methyl and hydroxy-ethyl and $R_2$ represents a member of the group consisting of methyl and ethyl.

2. The diazo-amino compound corresponding to the following formula

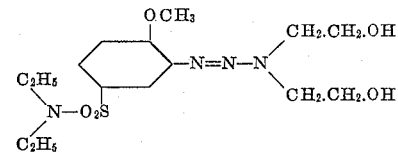

3. The diazo-amino compound corresponding to the following formula

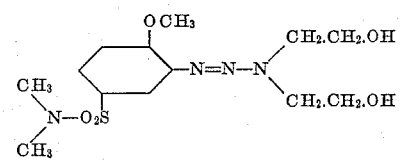

4. The diazo-amino compound corresponding to the following formula

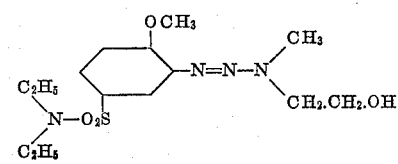

5. The diazo-amino compound corresponding to the following formula
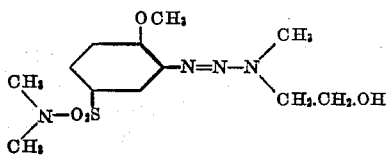
References Cited in the file of this patent
UNITED STATES PATENTS
| | | |
|---|---|---|
| 1,976,187 | Neelmeier et al. | Oct. 9, 1934 |
| 2,078,387 | Kern | Apr. 27, 1937 |
| 2,132,456 | Blackshaw et al. | Oct. 11, 1938 |